United States Patent [19]

Duttarer

[11] 4,136,909
[45] Jan. 30, 1979

[54] VEHICLE MODULE

[75] Inventor: Ralph M. Duttarer, St. Joseph, Mich.

[73] Assignee: Clark Equipment Company, Buchanan, Mich.

[21] Appl. No.: 824,462

[22] Filed: Aug. 15, 1977

[51] Int. Cl.$^2$ ............................................. B60P 1/04
[52] U.S. Cl. .................................. 298/17 B; 214/501; 280/475; 298/17 SG; 298/22 P
[58] Field of Search ............. 298/17 R, 17 B, 17 SG, 298/17 T, 19 R, 20 A, 22 R, 22 AE, 22 J, 5, 22 P, 10, 22 D; 214/501, 504, 515; 280/475

[56] References Cited

U.S. PATENT DOCUMENTS

| | | | |
|---|---|---|---|
| 2,350,141 | 5/1944 | Wood | 298/17 SG X |
| 2,549,996 | 4/1951 | Walsh | 298/19 R X |
| 2,570,334 | 10/1951 | Erjavec | 298/17 SG X |
| 2,823,817 | 2/1958 | Holsclaw | 298/5 X |
| 3,563,329 | 2/1971 | Licari | 180/51 X |
| 3,813,124 | 5/1974 | Roland | 298/17 B |

FOREIGN PATENT DOCUMENTS

| | | | |
|---|---|---|---|
| 1195183 | 11/1959 | France | 298/17 SG |
| 2285262 | 4/1976 | France | 298/17 SG |

Primary Examiner—Frank E. Werner
Attorney, Agent, or Firm—Kenneth C. Witt

[57] ABSTRACT

A dump body vehicle module for connection to a tractor module to form a complete vehicle. The dump body module includes a horizontally disposed frame with wheels adjacent one end and a coupling portion adjacent the other end for connecting it to a tractor module. A dump body is pivotally mounted on the frame for movement between a carrying position and a dumping position and hydraulic actuators are provided to move the dump body between the two positions. A pair of leg members are pivotally mounted on the dump body for movement between three positions, one a leg storage position, another for supporting the module on the ground, and the third for supporting the dump body in an elevated position relative to the frame.

4 Claims, 5 Drawing Figures

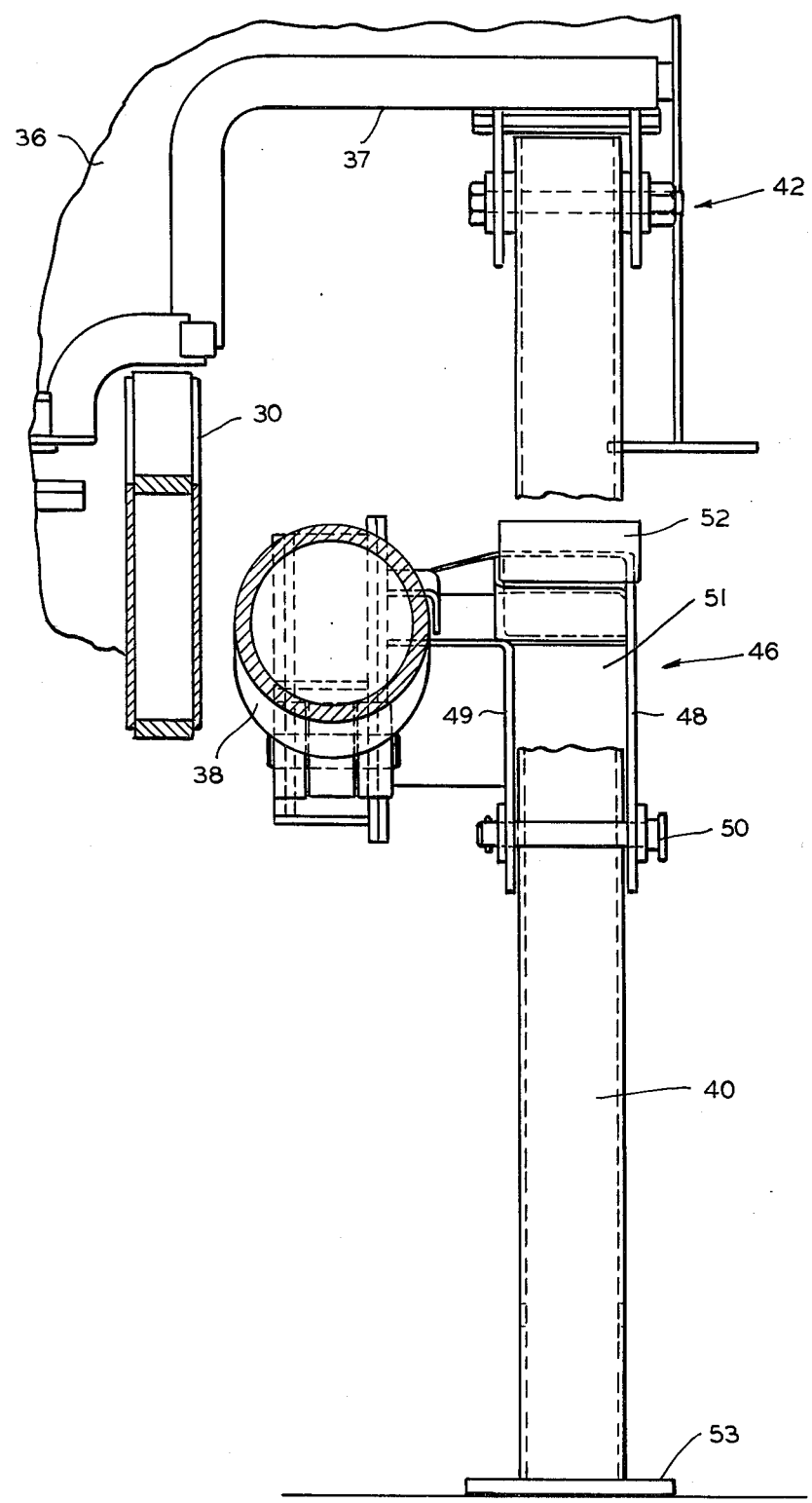

VEHICLE MODULE

The Government has rights in this invention pursuant to Contract No. DAAE07-75-C-0051 awarded by the Department of Defense.

BACKGROUND OF THE INVENTION

1. Field of the Invention

This invention relates to a dump body vehicle module for connection to a tractor module to form a complete vehicle.

2. Description of the Prior Art

U.S. Pat. No. 3,563,329 Licari, dated Feb. 6, 1971, is illustrative of the type of vehicle mentioned, that is, one comprising a tractor module and an implement module which can be readily connected together and disconnected.

SUMMARY OF THE INVENTION

A dump body vehicle module for connection to a tractor module to form a complete vehicle. The dump body module includes a horizontally disposed frame with ground engaging wheels connected to the frame adjacent one end. At the other end of the frame there is a coupling portion adapted for connection to a mating coupling portion on a tractor module. A dump body is pivotally mounted to the frame and means are provided for moving the dump body pivotally between a carrying position and a dumping position. Legs are provided which are adapted to be located between the dump body and the ground for supporting one end of the module when it is not connected to a tractor module.

BRIEF DESCRIPTION OF THE DRAWING

FIG. 5 is a fragmentary view along the line 5—5 of FIG. 2.

DESCRIPTION OF A PREFERRED EMBODIMENT

Figure 1:
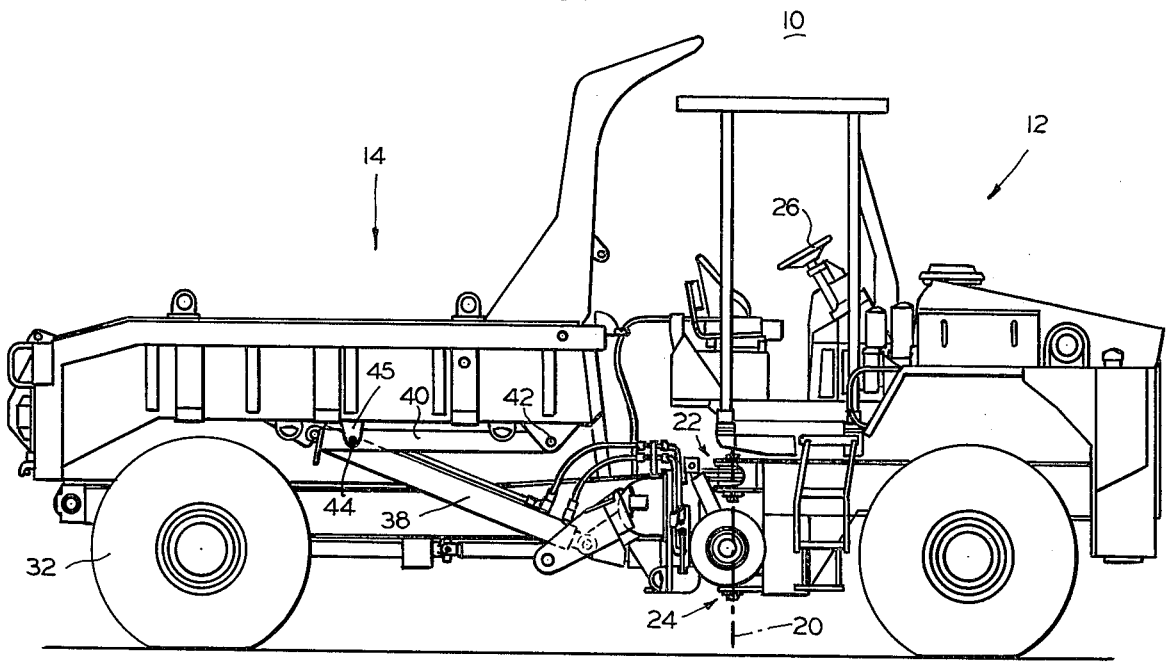
FIG. 1 is a side elevational view of a complete vehicle embodying the dump body module of the present invention.

Referring to FIG. 1 of the drawing, there is shown a complete articulated vehicle which is indicated generally by the numeral 10 and is composed of two separable parts, a tractor module indicated by the numeral 12 and an implement module indicated by the numeral 14. The implement module 14 embodies the present invention. The implement module illustrated is a dump body module which, when coupled to the tractor module as is shown in FIG. 1, makes a complete dump truck vehicle for the transportation and dumping of dirt or other material.

Figure 3:
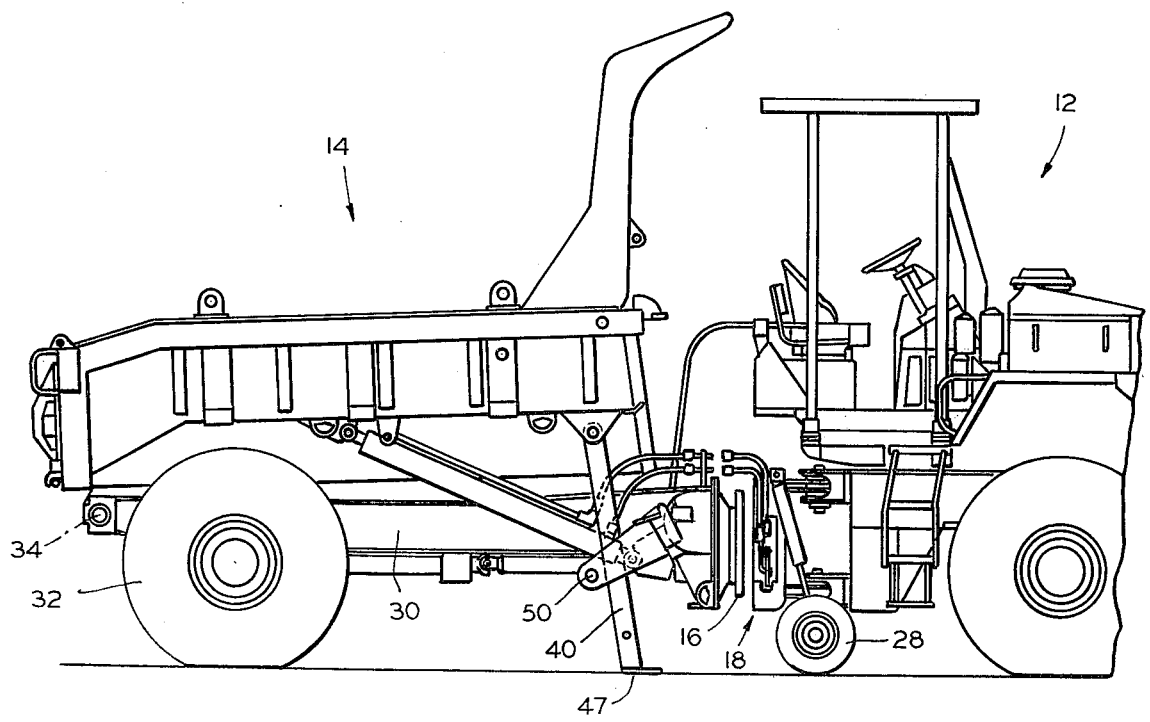
FIG. 3 shows both the dump body module and the tractor module, in position for coupling the two modules together to form a complete vehicle as in FIG. 1.

The tractor module 12 and the implement module 14 in FIG. 1 are detachably coupled together while FIG. 3 of the drawing illustrates the two modules slightly separated and ready to be coupled together. A coupling portion 16 on the implement module 14 meshes with and is locked to a coupling portion 18 on the tractor module 12 to make the connection between the two modules.

The truck 10 which is illustrated is a pivot steer type vehicle in which the steering of the truck, while it is in motion, is accomplished by pivoting front portion 12 with respect to the rear portion 14 about a pivot axis 20 through a pair of pivot connections 22 and 24, such pivoting being accomplished by a pair of hydraulic cylinders or actuators controlled by the operator's steering wheel 26. For more details on a similar steering mechanism see U.S. Pat. No. 3,889,976 dated July 15, 1975. It will be appreciated, however, that the present invention is not limited to use with a pivot steered truck but is equally applicable to other types of trucks such as a single frame vehicle with Ackerman steering and other known types.

In the preferred embodiment of the invention disclosed the tractor module is supported on auxiliary wheels 28 as shown in FIG. 3 when it is detached from the implement module. The auxiliary wheels 28 are used in maneuvering the tractor module for connection to the implement module and after such connection has been accomplished the auxiliary wheels 28 are retracted as illustrated in FIG. 1. For more information on the manner in which the auxiliary wheels are utilized reference can be had to the previously mentioned U.S. Pat. No. 3,563,329.

Figure 4:
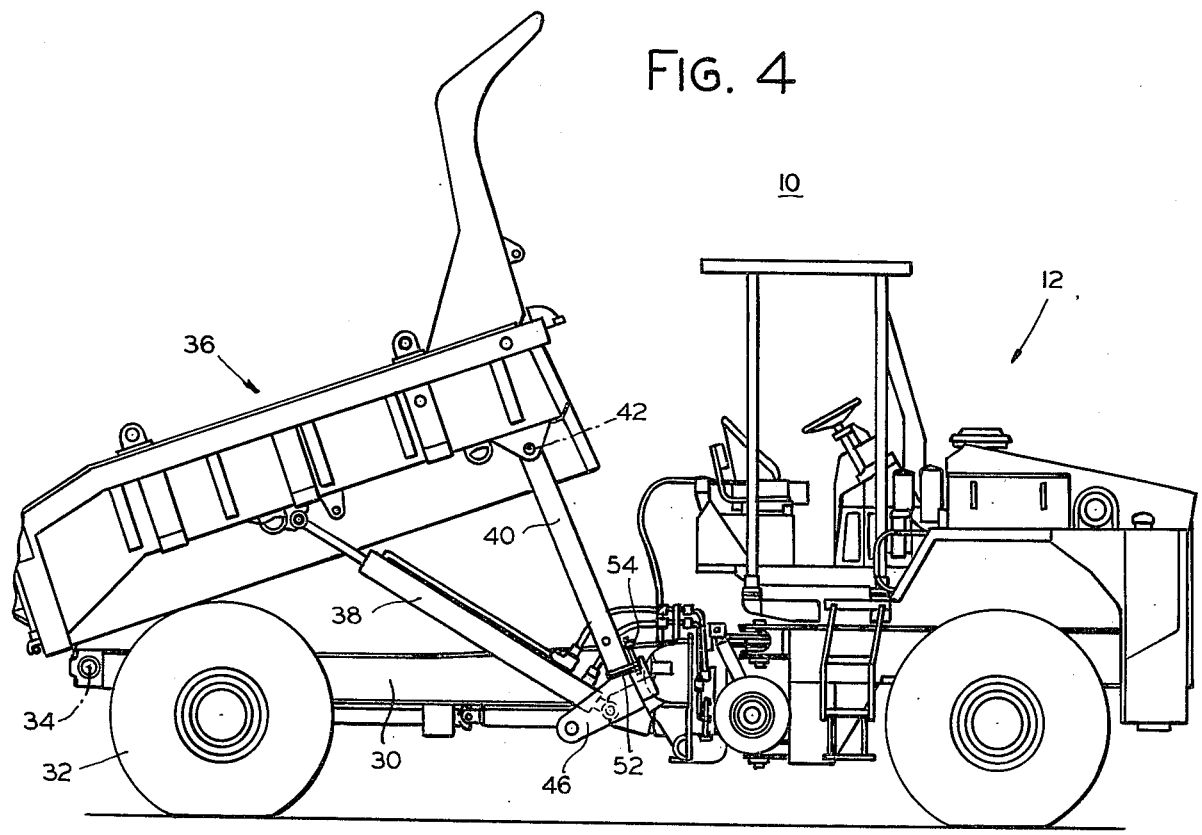
FIG. 4 is a side view showing the complete vehicle with the dump body in an elevated position.
Figure 2:
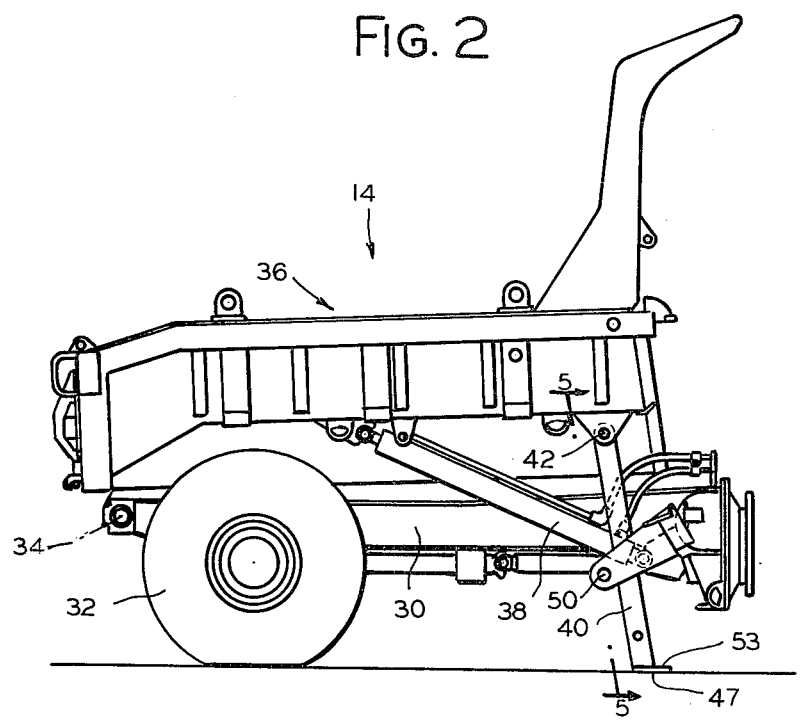
FIG. 2 is a side elevational view of the dump body module only.

FIG. 2 of the drawing shows the implement or dump body module of the present invention alone in storage position ready to be coupled to a tractor module. The module 14 of FIG. 2 comprises a horizontally disposed frame 30 with a pair of wheels 32 connected adjacent the rearward end of the frame for providing partial support for module 14. A dump body 36 is supported on the frame 30 and is pivotally connected to the frame about an axis 34. The dump body 36 is pivotably movable between the normal carrying position of FIGS. 1, 2 and 4 and a raised position as illustrated in FIG. 4. The pivotal movement of the dump body is carried out by a pair of hydraulic actuators 38, one on each side of the module 14. Actually, in the usual dumping operation the dump body 36 is pivoted to a higher position than is illustrated in FIG. 4.

The module 14 includes a pair of legs 40, one on each side, pivotally connected at 42 to dump body 36. As shown in FIG. 1, the legs 40 have a storage position in which they are pivoted up to a horizontally disposed position immediately below a bottom surface 37 (see FIG. 5) of dump body 36 and are secured in that position by pins 44 through suitable brackets 45 on the bottom surface 37 of dump body 36.

In FIG. 2, the legs 40 have been pivoted downwardly to positions in which they slant forwardly from the connection 42 with the distal end 47 resting on the ground. In the position of FIG. 2 the legs 40 support the entire front portion of the module 14, including the frame 30 as well as the dump body 36 while the wheels 32 provide the support at the other end. As shown in FIG. 2, the module 14 is ready to be connected to a tractor module.

FIG. 3 shows the relationship of the two modules just prior to connection or just after disconnection. A method for connecting the two modules together is disclosed and claimed in co-pending application Ser. No. 824,461 filed Aug. 15, 1977. In such method, while the legs 40 hold the dump body 36 a source of pressurized hydraulic fluid on the tractor module 12 is connected to pivot the frame 30 upwardly and downwardly to aid securing the proper position for coupling portion 16 to facilitate its connection to portion 18 on the tractor.

A pair of guide brackets 46 are located on opposite sides of frame 30 and arranged to co-act with legs 40. As shown in FIG. 5 when the legs 40 are in the position of FIG. 2 they are retained between two side plates 48 and 49 forming a portion of the bracket 46 and a pin 50 which is inserted between openings in side plates 48 and 49 for this purpose. The leg 40 is retained on the fourth side by the bight portion 51 of the bracket 46 and a base plate 52 which is secured to and forms a portion of the bracket 46.

FIG. 5 is a fragmentary view along the line 5—5 of FIG. 2 with a portion of the leg 40 broken away better to illustrate the bracket 46. FIG. 5 also shows the bottom surface 37 of the dump body 36 to which the leg 40 is pivotally connected about axis 42. FIG. 2 illustrates the relative positions of frame 30 and the actuator 38. It will be understood that the structure illustrated in FIG. 5 is duplicated in mirror image on the opposite side of the dump body module.

The arrangement just described makes it possible for frame 30 and the coupling portion 16 thereon to be adjusted upwardly and downwardly when the module is in the condition illustrated in FIGS. 2 and 3. This is done by operating the actuators 38 to extend them to lower the right end of the frame or to contract them to raise the right end, the brackets 46 moving downwardly and upwardly relative to legs 40. Thus, it will be understood that in the condition of FIGS. 2 and 3 the legs 40 support the dump body 36 and the latter in turn supports the frame 30 through the actuators 38, the latter being double acting.

When the two vehicle modules are coupled together as in FIGS. 1 and 4 and it is desired to perform maintenance or other operations on the hydraulic actuators 38, for example, the dump body 36 may be moved to the position shown in FIG. 4. In this position, the legs 40 are supported at their distal ends on base plates 52 which form part of brackets 46. There is a foot portion 53 (see FIG. 5) at the end of each leg 40 and a pin 54 (see FIG. 4) is installed in aligned openings in foot portion 53 and the base 52 on which it rests to serve as a safety lock and hold the leg 40 in position on the respective bracket 46.

The dump body is moved from the position of FIG. 1 to that of FIG. 4 by extending the hydraulic actuators 38 to raise the dump body 36 sufficiently, then moving the legs 40 so that they are in alignment with the base 52 and then contracting the actuators 38 again to lower the distal ends 47 of the legs down on to bases 52. After the pins 54 are put in place it is possible to remove the actuators 38 or take other such action. Meanwhile, the dump body 36 will remain securely in the elevated position shown in FIG. 4. After any necessary repairs have been completed and the hydraulic actuators and hydraulic system are operational again the dump body can be returned to its normal operating position shown in FIG. 1 by extending the actuators 38 to raise the legs 40 off the bases 52 and then remove pins 54. Then the actuators 38 are retracted to return the dump body to its normally horizontally disposed position of FIG. 1, and the legs 40 are returned to the stored position as shown in FIG. 1 and the retaining pins 44 reinstalled.

While I have described and illustrated herein the best mode contemplated for carrying out this invention, it will be appreciated that modifications may be made by those skilled in the art. Accordingly it should be understood that I intend to cover by the appended claims all such modifications which fall within the true spirit and scope of my invention.

I claim:

1. A dump body vehicle module for connection to a tractor module to form a complete vehicle, comprising a horizontally disposed frame, ground engaging wheels connected to said frame adjacent one end thereof, a coupling portion adjacent the other end of said frame adapted for detachable connection to a mating coupling portion on a tractor module, a dump body carried by said frame and pivotally connected thereto, double-acting hydraulic actuators connected between said dump body and said frame for moving said dump body pivotally between a carrying position and a raised position, and legs adapted to be positioned between said dump body and the ground for supporting one end of the module when it is not connected to a tractor module, the said hydraulic actuators supporting said frame from said dump body in the last mentioned condition.

2. A dump body vehicle module as in claim 1 in which said legs are pivotally connected to said dump body, and retaining means are provided for holding said legs in a horizontally disposed storage position beneath the dump body.

3. A dump body vehicle module as in claim 1 in which said frame is provided with guide brackets for said legs permitting said frame to be pivoted upwardly and downwardly relative to said body portion when the legs are resting on the ground.

4. A dump body vehicle module as in claim 3 in which said guide brackets means include base means on which said legs can be supported to maintain said dump body in a pivotally elevated position, and means for detachably securing said legs on said base means.

* * * * *